US005611055A

United States Patent [19]
Krishan et al.

[11] Patent Number: 5,611,055
[45] Date of Patent: Mar. 11, 1997

[54] METHOD AND APPARATUS FOR IMPLEMENTING A PCMCIA AUXILIARY PORT CONNECTOR FOR SELECTIVELY COMMUNICATING WITH PERIPHERAL DEVICES

[75] Inventors: Baldev Krishan; Baljeet Singh; Harihara Moorthy, all of Fremont, Calif.

[73] Assignee: Novalink Technologies, Fremont, Calif.

[21] Appl. No.: 313,414

[22] Filed: Sep. 27, 1994

[51] Int. Cl.⁶ .................................................. G06F 13/00
[52] U.S. Cl. .......................... 395/281; 395/309; 395/822; 395/882
[58] Field of Search .................................. 395/281, 282, 395/822, 309, 882

[56] References Cited

U.S. PATENT DOCUMENTS

| | | | |
|---|---|---|---|
| 4,794,520 | 12/1988 | Kobus, Jr. et al. | 395/287 |
| 5,249,218 | 9/1993 | Sainton | 379/59 |
| 5,276,443 | 1/1994 | Gates et al. | 395/822 |
| 5,317,693 | 5/1994 | Cuenod et al. | 395/829 |
| 5,335,338 | 8/1994 | Proesel | 395/500 |
| 5,365,513 | 11/1994 | Copley et al. | 370/17 |
| 5,510,778 | 4/1996 | Krieter et al. | 340/825.44 |
| 5,537,558 | 7/1996 | Fletcher et al. | 395/309 |
| 5,540,597 | 7/1996 | Budman et al. | 439/77 |

OTHER PUBLICATIONS

Mori, "The PCMCIA Developer's Guide," Sycard Technology, Sunnyvale, California (1994), p. 112.
"An Introduction to PCMCIA And PC Card Technology," PCMCIA Headquarters, Sunnyvale, California, brochure, circa 1992.
"Modem Communications: AModem Primer", Multitech Systems, Inc., Mounds View Minnesota (Sep. 1992).
R. H. Tridgell, "Radiopaging and Messaging," in Mobil Information Systems, Artech House, Inc. (J. Walker, ed. 1990), pp. 16–57.
"Rockwell RC96ACL/RC144ACL Modem and RC96 ACi/RC144ACi Modem Designer's Guide," Rockwell International, digital Communication Division (Apr. 1993).
"PCF5001 POCAG Paging Decoder." Data Sheet, Philips Semiconductors (Jun. 1993).
"Q. 12–1/8, S.P. 12A/8, Radio Paging Systems", OCIR Radio Paging Code Standards Group (1980).
"Recommendation 539–1, Technical and Operational Characteristics of Future International Radio–Paging Systems", OCIR Radio Paging Code Standards Group (1982).
"Report 499–3, Radio–Paging Systems", OCIR Radio Paging Code Standards Group (1982).
"Recommendation 584, Standard Codes and Formats For International Radio Paging," OCIR Radio Paging Code Standards Group (1982).
"Report 900, Radio–Paging Systems," OCIR Radio Paging Code Standards Group (1982).

*Primary Examiner*—Jack B. Harvey
*Assistant Examiner*—Sumati Lefkowitz
*Attorney, Agent, or Firm*—Fish & Neave; Nicola A. Pisano; Michael J. DeHaemer

[57] ABSTRACT

Circuitry and methods are provided for a standardized serial interface. The interface uses auxiliary port connector pin of a device conforming to the Personal Computer Memory Card International Association (PCMCIA) standard as a serial bus. Protocols are provided that allow a host computer to selectively connect to and communicate with either the PCMCIA based device or with devices connected to the serial bus. The circuitry and protocols support a daisy-chain of multiple devices from a single PCMCIA based device.

23 Claims, 4 Drawing Sheets

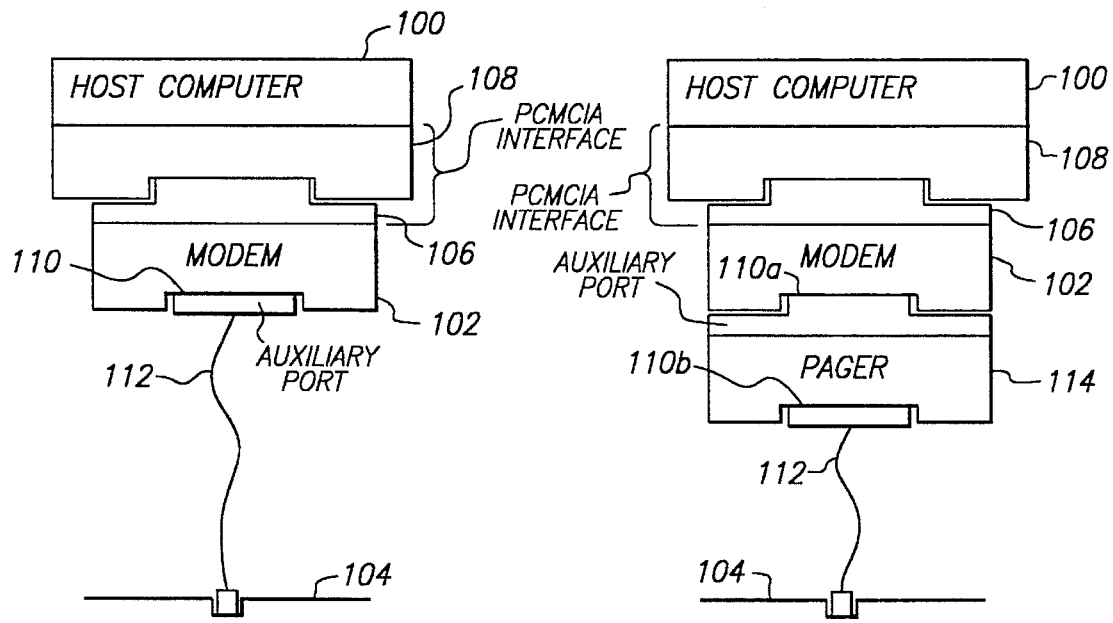

METHOD AND APPARATUS FOR IMPLEMENTING A PCMCIA AUXILIARY PORT CONNECTOR FOR SELECTIVELY COMMUNICATING WITH PERIPHERAL DEVICES

BACKGROUND OF THE INVENTION

This invention relates to circuitry for providing an interface between a host computer and multiple peripheral devices. More particularly, the invention relates to means for interfacing multiple electronic devices such as modems, pagers, faxes, or other circuitry to a computer via a single PCMCIA slot.

Communication devices such as pagers and electronic mail receivers, which allow people to be contacted even when away from a telephone, are becoming increasingly popular. Callers can send short numeric or alphanumeric messages to a service subscriber. A typical numeric paging message is the telephone number of the caller. Wireless electronic mail ("e-mail") receivers allow the user to receive longer alphanumeric messages, as well as information provided by various subscription services.

Due to their small size and limited power source (i.e. a battery), pager and e-mail receiver displays are less than ideal. It would therefore be desirable if messages could be downloaded from an e-mail receiver or pager to a personal computer (PC) or other host device. Because of their relatively small size and weight, a laptop or palmtop computer would be an ideal host device for a pager or e-mail receiver. Presently, many of these small computers come equipped with one or two PCMCIA (Personal Computer Memory Card International Association) expansion slots. Named after the Personal Computer Memory Card International Association, of Sunnyvale California, the PCMCIA specification was originally drafted to cover so-called memory cards; however, numerous devices conforming to PCMCIA specification are now available, including, for example, serial ports, hard disk drives, network interfaces, and Global Positioning System (GPS) receivers.

As is well-known, computers can communicate over telephone lines using modems, and many PCMCIA modems are available. In order to add wireless e-mail (or paging) and modem capabilities to a computer system, it has generally been necessary to add both e-mail and modem units. Because this requires the use of two separate devices, two computer slots or communication ports must be used. In a laptop computer, which may have only one or two PCMCIA expansion slots, using two devices may not be possible, or at best would use up all available slots and leave no room for further expansion or upgrade. Although, the PCMCIA standard allows for hot-swapping of devices, this is not a very desirable or practical method of using multiple PCMCIA devices when there are more devices than available slots.

One possible solution to this problem would be to combine the pager or wireless e-mail receiver with a modem into a single integrated PCMCIA card. Such a device, combining a fax/data modem and a radio pager is disclosed in co-pending commonly assigned U.S. patent application Ser. No. 08/174,797, which is incorporated herein by reference. With such a device a user would only need one PCMCIA slot to use both modem and pager communication devices. This approach is not without its drawbacks, however. Due to the specified dimensions of a PCMCIA slot and card, and due to the need to provide the pager with a battery for power when it is not connected to the computer, the combined pager/modem device has bulkier packaging than either the pager or PCMCIA modem alone. It would therefore be advantageous to be able to separate the modem (PCMCIA card) and e-mail receiver or pager components of the device from each other.

Another drawback to the combination approach is that a user is limited to those particular combinations of peripherals being offered by the various manufacturers. The computer user, therefore, does not have flexibility in choosing the combination of peripherals. Furthermore, the user may prefer that certain peripherals are built by specific, and possibly different, manufacturers. Indeed, for special purpose peripherals there may be only one vendor available. Such circumstances may preclude purchasing a single integrated device having all the desired component functionality. It would therefore be desirable to provide a low cost and easily implemented interface between the host computer and the peripheral that would permit the user to "mix-and-match" component devices from various manufacturers.

An alternative to the integrated device approach would be to develop and standardize a means for multiple devices to share a single PCMCIA interface. The PCMCIA specification provides for a 15 pin peripheral connector, or auxiliary port, which is intended to allow a PCMCIA card to connect to the external world. The auxiliary port has been used to connect a PCMCIA device to, for example, a network, a telephone line, or an external floppy diskette drive. Often such connections utilize a subset of the 15 pins available in the auxiliary port connector. It would therefore be desirable to include additional circuitry on a PCMCIA device to make it possible to configure some of the unused pins as a serial bus for connecting additional devices to the host computer.

SUMMARY OF THE INVENTION

In view of the foregoing, it is an object of this invention to provide a radio frequency e-mail receiver or pager with a means of interfacing to a host computer.

It is a further object of the invention to provide a primary PCMCIA device with additional interface circuitry for supporting data communications between an e-mail receiver or pager and a host computer.

It is also an object of the invention to provide a data communication protocol that allows a host computer to selectively communicate with a primary PCMCIA device and/or an e-mail receiver or pager.

It is a further object of the present invention to provide a method and apparatus for connecting multiple peripheral devices to a host through a single PCMCIA interface slot.

It is also an object of the present invention to provide circuitry to employ pins of a PCMCIA auxiliary port connector to create a serial bus for connecting additional peripheral devices to the host computer.

It is an additional object of the invention to provide a means for the host computer to selectively communicate with a primary device on a PCMCIA card and any devices attached via the PCMCIA card auxiliary port.

It is still another object of the invention to allow multiple peripheral devices to coexist, and cooperate in communicating with a host computer through a single PCMCIA interface slot.

These and other objects of the invention are accomplished in accordance with the principles of the present invention by defining and standardizing an interface and protocol for utilizing a subset of the 15 pins in a PCMCIA auxiliary port as a serial expansion bus. Circuitry in a PCMCIA card and in an attached device, such as an e-mail receiver or pager, along with appropriate software on the host computer and in the attached device, allows the host computer to selectively communicate with the PCMCIA device or with the attached device.

Further features of the invention, its nature and various advantages, will be more apparent from the accompanying drawings and the following detailed description of the preferred embodiments.

BRIEF DESCRIPTION OF THE DRAWINGS

FIG. 1 is a block diagram showing a typical arrangement of a host computer and a PCMCIA modem.

FIG. 2 depicts in block diagram form the arrangement of a host computer, an external device, such as a pager or radio e-mail receiver, and a PCMCIA modem.

FIGS. 3a–c depict pinout diagrams for an auxiliary port connector of a PCMCIA card.

DETAILED DESCRIPTION OF THE INVENTION

Figure 4:
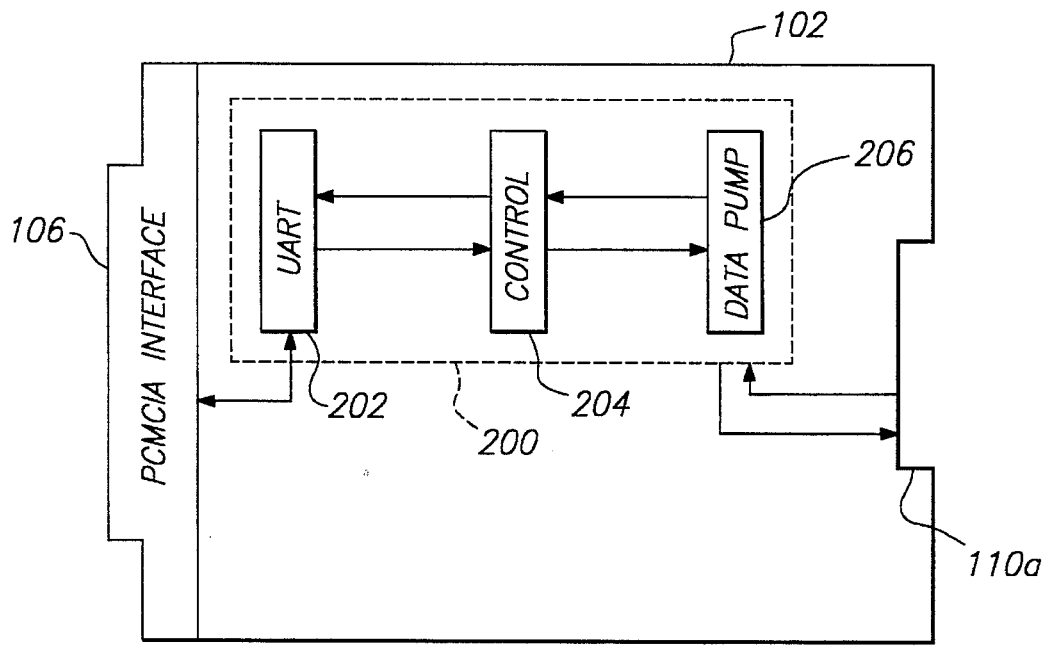
FIG. 4 is a schematic showing in block diagram form typical internal circuitry for a prior art PCMCIA modem.

The present invention relates generally to a method and circuitry for a host computer to selectively communicate with a primary device, for example modem circuitry on a PCMCIA card, coupled to the host computer, and with a secondary device, for example a pager, coupled to the host computer via the primary device. The detailed description of the invention is presented as a PCMCIA fax/modem and a separate pager constructed in accordance with the principles of the present invention. It would be readily apparent to one skilled in the art that devices other than pagers and fax/modems could be designed with similar circuitry and capabilities without departing from the spirit of the present invention.

Referring to FIG. 1, typical interconnections among previously known host PC 100, PCMCIA based modem 102, and telephone wall jack 104 are described as an illustrative context for the present invention. Modem 102 is constructed in accordance with the PCMCIA specification and includes PCMCIA connector and interface circuitry 106, enabling the modem to be plugged into a PCMCIA expansion slot to make electrical contact with corresponding PCMCIA interface circuitry 108 in host computer 100. PCMCIA interface circuitry 106 and 108 provide a parallel data path, currently 8 or 16 bits, for communicating information between host 100 and PCMCIA modem 102. The modem also includes a standard 15-pin PCMCIA auxiliary port 110 for connection to telephone wall jack 104 through adaptor cable 112.

As shown in FIG. 2, an illustrative embodiment of the present invention includes the addition of pager 114. As in FIG. 1, PCMCIA modem 102 and host computer 100 are coupled through PCMCIA interface circuitry 106 and 108. However, interposed between PCMCIA modem 102 and telephone wall jack 104 is pager 114. The pager is coupled to the modem by plugging directly into auxiliary port 110a of PCMCIA modem 102. Alternatively, an adaptor cable (not shown) could be used to connect pager 114 to auxiliary port 110a. Pager 114, which includes standard 15-pin PCMCIA auxiliary port 110b, is connected to telephone system wall jack 104 using adaptor cable 112 as in FIG. 1.

Although the functions of the individual pins in the auxiliary port have not been standardized by the PCMCIA association, some assignments have become fairly commonplace and some have been formalized by various PCMCIA card manufacturers. FIG. 3a shows a pinout diagram with a common pin assignment used in previously known PCMCIA modems. Only two signals, TIP and RING are needed to connect to the telephone system; hence, only pins 14 and 15 are used.

A modem interface for use with cellular telephones is also known and its pinout is given in FIG. 3b. In order to support the complexity of setting up a telephone call via a cellular telephone, additional signal paths are necessary between the modem and cellular telephone. The $R_x$ and $T_x$ signals, pins 4 and 6 respectively, are for data received and transmitted by the modem. Pin 1, GND, provides a common ground or voltage reference between the cellular telephone and the modem. CEL_CLK, pin 10, synchronizes data transfer between the two devices, while pins 2 and 8, DAA/CELL and CEL_BUSY respectively, are used for call setup and monitoring functions.

In order to maintain compatibility with commonly used or formalized interfaces, it is important that the interface provided by the present invention not reuse a previously assigned pin for an incompatible purpose. For this reason, in a preferred embodiment of the present invention a pin selection is chosen to be compatible with the pinout of FIGS. 3a and 3b. In the preferred embodiment of the present invention, therefore, pin 11 (DATA_FROM_HOST) is used to carry data from the host to the pager and pin 12 (DATA_TO_HOST) is used to carry data from the pager to the host. Control of the host-pager interface is managed by the pager asserting a signal on pin 9 (CONTROL) under direction of the host as described hereinbelow.

Referring now to FIG. 4 conventional internal circuitry 200 of PCMCIA modem 102 is described as forming an illustrative environment for implementation of the present invention. Exemplary internal circuitry is also disclosed in co-pending and commonly assigned U.S. patent application Ser. No. 08/174,797, which is incorporated herein by reference. Data is transferred in a parallel format between host computer 100 and universal asynchronous receiver-transmitter 202, commonly known as a UART, within the modem, via PCMCIA interface 106. A suitable UART is a NS16550AN integrated circuit (IC) such as those manufactured by National Semiconductor of Santa Clara, Calif. The parallel data is converted into a serial bit stream by UART 202 and then sent to modem control circuitry 204. Data pump 206 in conjunction with modem control circuitry 204 encodes the serial bit stream in a manner suitable for transmission through the telephone network. Reception of data occurs in the reverse order, with data pump 206 and modem control circuitry 204 decoding a received signal to recover a serial bit stream. That bit stream is then converted into parallel data by UART 202 for communication to host computer 100.

As is already known in the art, the host computer 100 may also send commands to the modem, in order to change various configuration parameters which control the modem's operation, for example setting the modem baud rate. Typically, commands are comprised of a sequence of data values beginning with an attention code or signal, followed by one or more command codes with their associated parameters, and ending with a command termination character. Commands sent to the modem, are not recognized or acted upon until receipt of the termination character. Although modems have a default command termination character, many modems have the capability of redefining the command termination character under program control.

Figure 5:
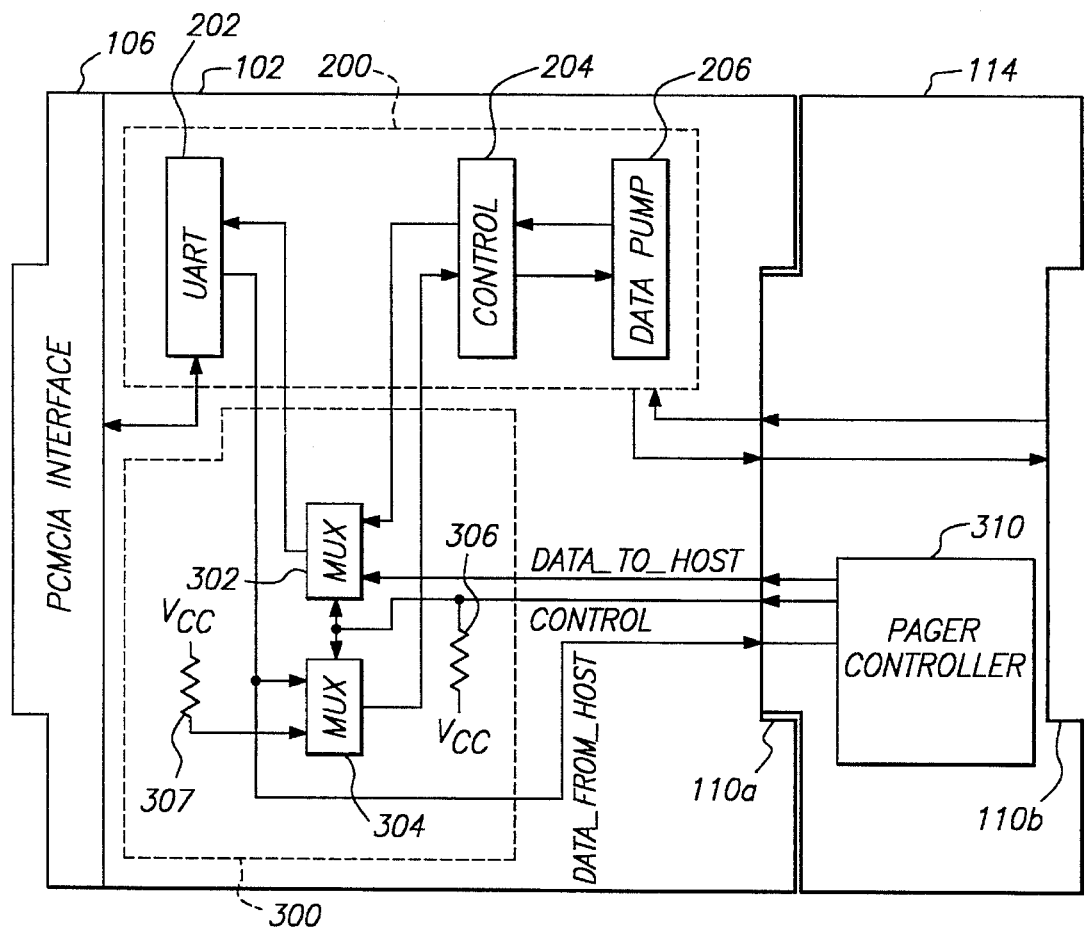
FIG. 5 depicts a block diagram schematic of a modem and pager constructed in accordance with principles of the present invention.

With respect to FIG. 5 and in accordance with principles of the present invention, a secondary device, for example a pager, may be coupled to the host computer through the auxiliary port of a primary device, for example a PCMCIA modem. In a preferred embodiment of the present invention, the host controls the interface to the secondary device by sending a "connect" command comprising a preselected command code to the primary device. The particular command code is programmed into software running on the host computer, possibly as a configuration option, and is selected so that it does not correspond to actual command codes recognized by the primary device. In order to prevent the primary device from acting on the "connect" command, the command code must not include the command termination character currently being used by the primary device. When the host later reestablishes a connection with the primary device, the host transmits the command termination character for the primary device, terminating any pending command sequences in the primary device. The primary device will then try to act on the command sequence, which was meant for the secondary device. The resulting error message can be used by the host as a way of confirming reestablishment of the connection to the primary device.

The secondary device also receives, via the DATA_FROM_HOST line, data sent to the primary device, and upon recognizing the preselected command sequence, the secondary device asserts a control signal. When the control signal is asserted, the data path from the host to the primary device is blocked and a data path from the secondary device to the host is established via the DATA_TO_HOST line. To discontinue communications with the secondary device, the host sends another (or even the same) command code to the secondary device, causing it to release the control signal, thereby reestablishing the data paths between the host computer and the primary device.

As shown in FIG. 5, pager 114 is interfaced to PCMCIA device 102 including modem circuitry 200 and PCMCIA interface 106. Modem circuitry 200 comprises UART 202, modem control circuitry 204, and data pump 206, which function as described above with respect to FIG. 4. In accordance with the present invention, PCMCIA device 102 also includes switching circuitry 300 added in the data paths between UART 202 and modem control circuitry 204. When pager 114 is not plugged into modem auxiliary port 110a, or when pager 114 is not asserting the control signal on the CONTROL line, the control signal is driven to a default state by resistor 306. This causes multiplexers (MUXes) 302 and 304 to couple UART 202 to modem control circuitry 204, thus the modem portion of PCMCIA device 102 functions normally. A suitable MUX for use as MUXes 302 and 304 is a CD4053 triple 2-channel multiplexer/demultiplexer IC manufactured by National Semiconductor of Santa Calara, Calif. Serial data sent from UART 202 to modem control circuitry 204 is also sent along the DATA_FROM_HOST line to pager 114. When the pager receives and recognizes a preselected command code, it asserts a control signal on the CONTROL line as described previously herein. An asserted control signal causes MUXes 302 and 304 to disconnect the signal paths between UART 202 and modem control circuitry 204. With the inputs of MUXes 302 and 304 shifted, a mark signal is provided to the input of modem control circuitry 204 by pullup resistor 307. The DATA_TO_HOST line carrying data from pager 114, is supplied to UART 202 to be delivered to the host. Thus, serial data from pager controller 310 is sent to host computer 100 via MUX 302 and UART 202. When the host no longer needs to communicate with pager 114, a command code is sent causing pager controller 310 to release the control signal on the CONTROL line. This causes MUXes 302 and 304 to restore the signal paths between UART 202 and modem control circuitry 204.

In addition to circuitry in the PCMCIA device, control circuitry must be provided in the secondary device, for example the pager, to receive and recognize the connect command and to assert a control signal on the CONTROL line. The control circuitry comprises, for example a microcontroller or microprocessor, although a microsequencer or programmable logic device may also be used. An Intel 8031 microprocessor, available from Intel Corporation of Santa Clara, Calif., is an exemplary microprocessor suitable for use as control circuitry in the second device. Furthermore, in order to preserve modem functionality, all signals on auxiliary port 110a of the primary PCMCIA device 120 are fed through to the corresponding pins on auxiliary port 110b of pager 114. This arrangement allows the primary device to still be connected to other devices, like alternate telephone equipment, whether or not the secondary device is installed.

Figures 6A, 6B:
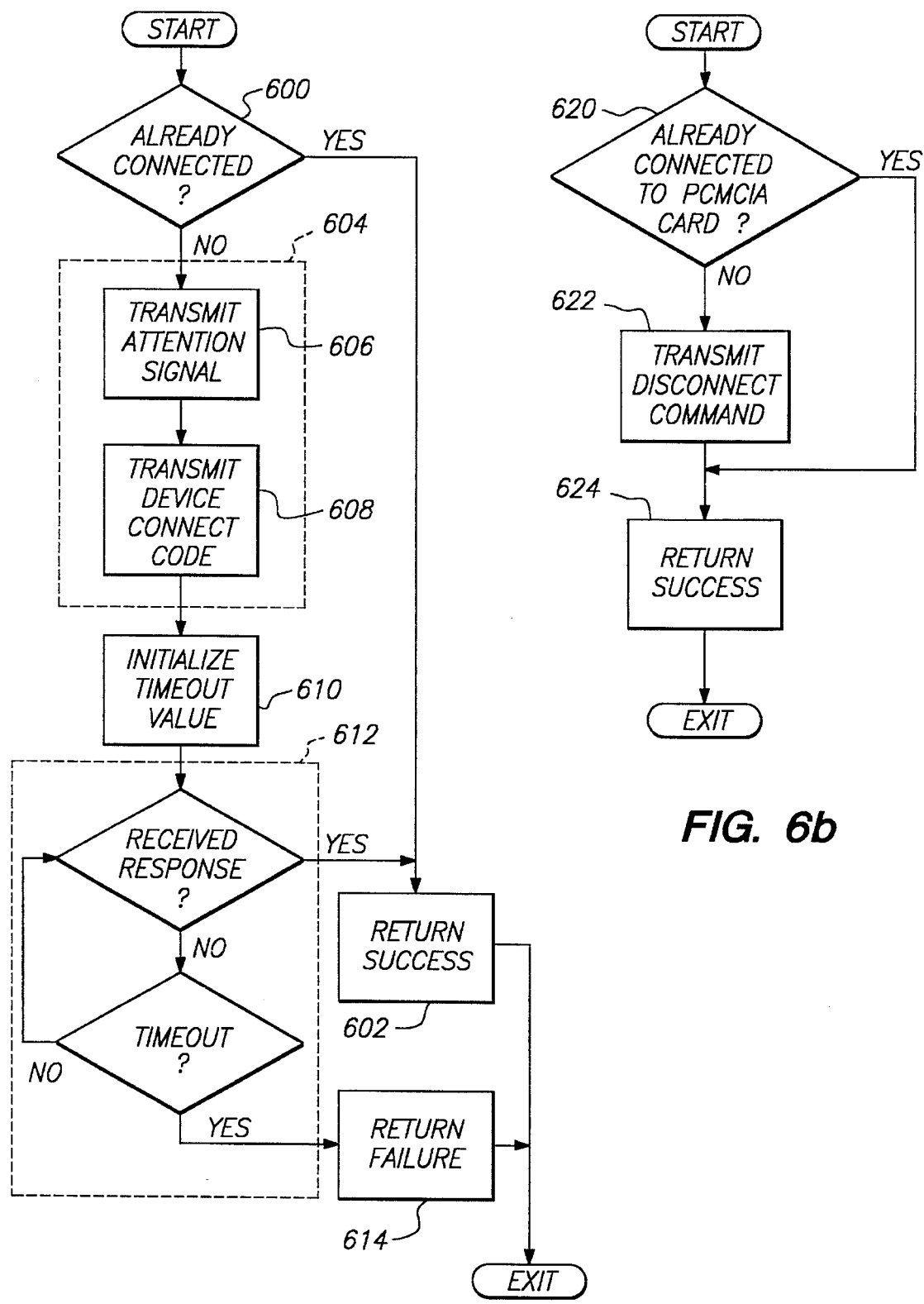
FIG. 6a–c shows several flow charts depicting the operation of the auxiliary port interface.
Figure 6C:
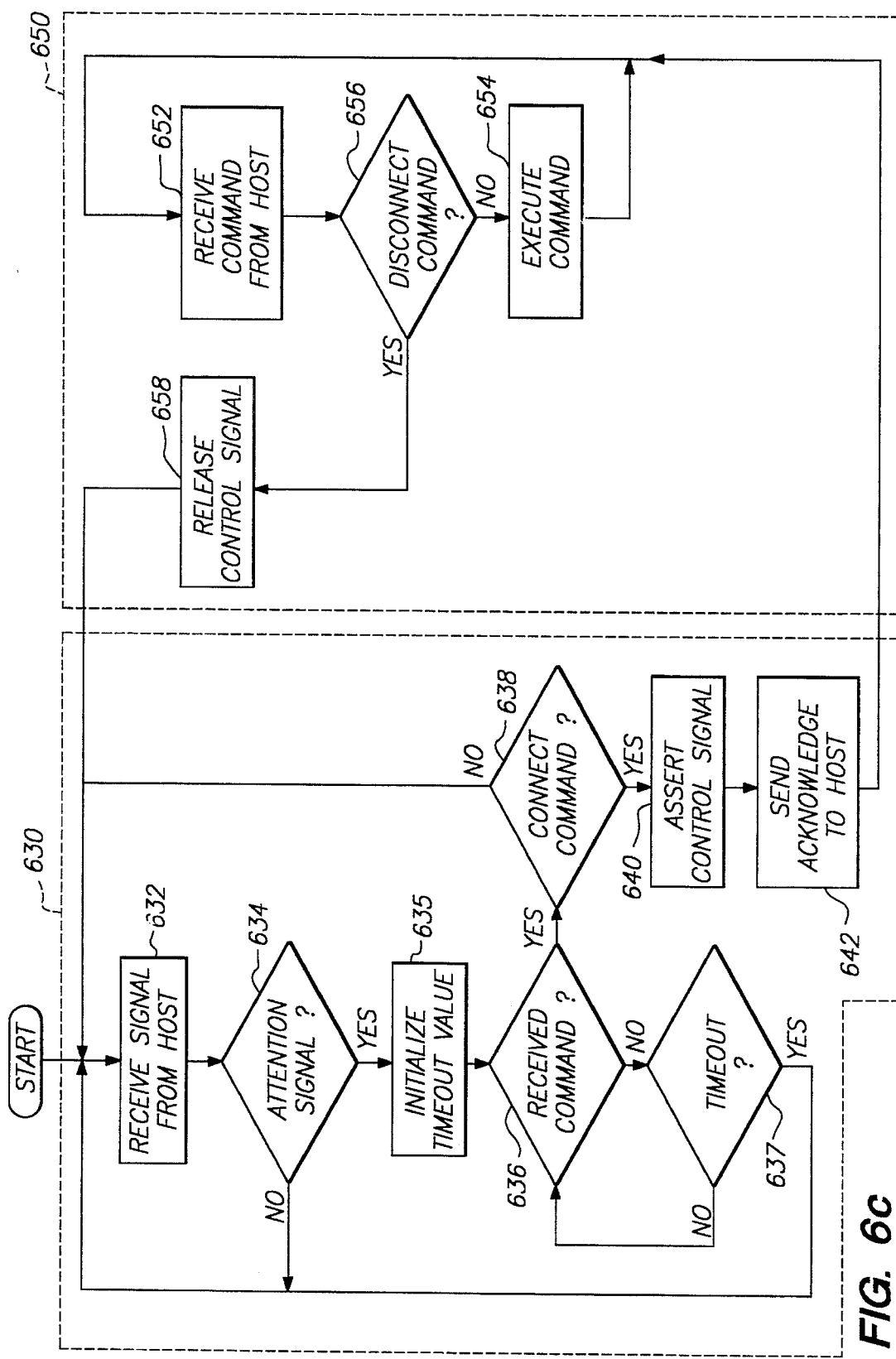

Referring now to FIGS. 6a–c, operation of an auxiliary port interface in accordance with the present invention is described. An illustrative routine shown in FIG. 6a is executed on host computer 100 for connecting to a secondary device, for example a pager, via auxiliary port 110a. First, the routine checks an internally maintained status indicator, step 600, to determine whether the device is already connected. If the host is already connected to the secondary device the routine returns an indication of success, step 602. If the connection is not already established then the host sends a connect command, step 604, consisting of a unique command code, to the primary device. The command code may be a single data value, or may be multiple data values sent in sequence, and is unique in the sense that it is not recognized as a command by the primary device. In order to establish a connection, host computer 100 transmits an attention signal, step 606, for example a "break" signal followed by a connect command, step 608. After transmitting the connect command, the routine sets up a timeout interval, step 610, and waits for an acknowledgement from the secondary device, step 612. If the acknowledgment is received prior to expiration of the timeout then a successful indication is returned, step 602; otherwise, if the timeout period expires, for example, because the secondary device is not attached, the routine returns an indication of failure, step 614.

An illustrative routine in accordance with the present invention by which a host disconnects from a secondary device attached via an auxiliary port of the primary device, and reconnects to the primary device itself, is shown in FIG. 6b. If the host is already connected to the primary device, step 620, then no action is required, otherwise a disconnect command is sent, step 622. In either case a successful indication is returned, step 624.

Referring now to FIG. 6c, an illustrative routine, executed on the secondary device, attached via the auxiliary port of the primary device, is described for establishing a communications link between the secondary device and the host computer. Upon power up or reset, the secondary device enters the disconnected state, box 630, and loops waiting for a connect command. For a two part command code, the device continually receives data sent to the primary device by the host computer, step 632, and monitors that data to detect an attention signal, step 634. Once an attention signal is received, the secondary device waits for a connect command from the host, step 636. If the next data value received is the connect command, step 638, the secondary device asserts a control signal, step 640, which disconnects the primary device and connects the secondary device, as described hereinabove. Alternatively, if the next data value is not the connect command the secondary device returns to the disconnected state, box 630, and resumes waiting for an attention signal, step 634.

After asserting the control signal, step 640, and establishing a communication path to the host computer, the secondary device transmits an acknowledgement to the host, step 642, and enters the connected state, box 650. In the connected state the secondary device receives commands from the host, step 652, which are executed by the secondary device, step 654. It is contemplated that commands recognized by the secondary device are application specific, but must include at least connect and disconnect commands. Additional commands may include, for example, commands directing the secondary device to transmit e-mail messages to the host computer, or commands changing configuration parameters of the secondary device. If a command is a disconnect command, step 656, the secondary device releases the control signal, step 658, and enters the disconnected state, box 630. The communication path from the secondary device to the host is then discontinued and the path between the primary PCMCIA device and host is reestablished.

Numerous variations and embellishments may be made to the interface routines provided in FIGS. 6a–c without departing from the principles of the present invention. For example, if after receipt of an attention signal a second attention signal is received, the secondary device may restart the disconnected state over again, waiting for an attention signal, or the secondary device may continue to wait for a connect command. A check for a timeout condition after receipt of the attention signal and before receipt of the connect command may also be included. It will be appreciated by those skilled in the art that other modifications may be made to the interface routines without departing from the spirit of the present invention.

Although the preferred embodiment has been disclosed as a single pager attached to the auxiliary port of a PCMCIA modem, one skilled in the art will appreciate that switching circuitry, similar to that shown in FIG. 5, also may be included in pager 114 or other device connected via the modem auxiliary port. For such an arrangement, a third device, such as a GPS receiver or wireless network interface card, could also be coupled between the pager auxiliary port 110b and the telephone wall jack 104. The host computer 100 could then send a first command code to establish a connection to the pager, as described hereinabove, followed by a second command code causing the GPS receiver to assert a control signal to disconnect the pager and establish a connection with the host computer as described previously. Alternatively, the switching circuitry may be designed to propagate the control signal up a daisy-chain of devices, thus allowing the daisy-chained device to switch off, or disconnect, the primary device and all additional devices at one time. Each additional device may have its own unique command code to which it responds, provided that none of the command codes could be recognized by any of the intervening components of the daisy-chain. In this manner, numerous devices could be cascaded in daisy-chain fashion to the primary PCMCIA device and thereby share a single PCMCIA interface.

In still another embodiment of the present invention, signal lines may be utilized in addition to the DATA_FROM_HOST, DATA_TO_HOST and CONTROL lines. Specifically hardware flow control signals may also be employed to regulate the data transfer rate between host and device. Additionally, a data available signal may be provided for the secondary device to indicate it has data available without first requiring the host to establish a connection with the secondary device to determine its status.

It will be appreciated by those skilled in the art that the present invention can be practiced and implemented by other than the described embodiments, which are presented for purposes of illustration and not of limitation, and that the present invention is limited only by the claims that follow:

We claim:

1. Circuitry for a host computer to selectively communicate with at least two peripheral devices via an expansion slot, the circuitry comprising:
   a first peripheral device adapted for coupling to the expansion slot, the first peripheral device including:
      circuitry for performing a first peripheral task; interface circuitry coupling the first peripheral device to the host computer for transferring data therebetween;
      an auxiliary port having a DATA_FROM_HOST line, a DATA_TO_HOST line, and a CONTROL line;
      a data path coupling the interface circuitry to the DATA_FROM_HOST line, so that data transmitted by the host computer through the interface circuitry is serially transmitted on the DATA_FROM_HOST line; and
      switching circuitry coupled to the interface circuitry, to the circuitry for performing a first peripheral task, and to the DATA_TO_HOST and CONTROL lines, the switching circuitry responsive to a control signal asserted on the CONTROL line, and selectively changeable between a first state wherein the circuitry for performing a first peripheral task is connected to the interface circuitry and the DATA_TO_HOST line is disconnected from the interface circuitry, and a second state wherein the circuitry for performing a first peripheral task is disconnected from the interface circuitry and the DATA_TO_HOST line is connected to the interface circuitry; and
   a second peripheral device coupled to the auxiliary port of the first peripheral device, the second peripheral device including:
      circuitry for performing a second peripheral task; and
      control circuitry coupled to the circuitry for performing a second peripheral task and to the DATA_TO_HOST, DATA_FROM_HOST, and CONTROL lines, so that the control circuitry asserts a control signal on the CONTROL line responsive to a first predetermined data sequence on the DATA_FROM_HOST line, and removes the control signal from the CONTROL line responsive to a second data sequence on the DATA_FROM_HOST line.

2. The circuitry of claim 1 wherein the interface circuitry comprises circuitry operable in accordance with PCMCIA expansion slot specifications.

3. The circuitry of claim 2 wherein the PCMCIA expansion slot is a Type I PCMCIA slot, a Type II PCMCIA slot, or a Type III PCMCIA slot.

4. The circuitry of claim 1 wherein the first peripheral device is a FAX/modem.

5. The circuitry of claim 1 wherein the second peripheral device comprises circuitry for receiving data transmitted via electromagnetic signals.

6. The circuitry of claim 5 wherein the second peripheral device is selected from the group consisting of a pager, an electronic mail receiver, a network interface card and a GPS receiver.

7. The circuitry of claim 1 wherein the second peripheral device comprises circuitry for transmitting data via electromagnetic signals.

8. The circuitry of claim 7 wherein the second peripheral device is a network interface card.

9. The circuitry of claim 1 wherein each of the first and second predetermined data sequences comprise an attention code followed by a command code.

10. The circuitry of claim 1 wherein the control circuitry is a microcontroller, a microprocessor, a microsequencer, or a programmable logic device.

11. The circuitry of claim 1 wherein the interface circuitry and the switching circuitry are integrated into one or more chips of a chip set.

12. The circuitry of claim 1 wherein the data path coupling the interface circuitry to the DATA_FROM_HOST line further comprises parallel-to-serial data conversion circuitry.

13. The circuitry of claim 1 wherein the switching circuitry comprises a multiplexer circuit.

14. Circuitry for selectively establishing a data path between a host computer and either a first device mounted on a peripheral card coupled to an expansion slot of a host computer, or a second device coupled to an auxiliary port of the peripheral card, the circuitry comprising:

interface circuitry coupling the peripheral card to the host computer for transferring data therebetween;

a DATA_FROM_HOST line coupled to the auxiliary port;

a data path coupled between the interface circuitry, and the DATA_FROM_HOST line, the data path operative to serially transmit on the DATA_FROM_HOST line data transmitted by the host computer to the peripheral card;

a DATA_TO_HOST line coupled to the auxiliary port;

a CONTROL line coupled to the auxiliary port;

circuitry for biasing the CONTROL line to a predetermined, non-asserted state when the second device is not coupled to the auxiliary port; and switching circuitry coupled to the interface circuitry, to the first device, and to the DATA_TO_HOST and CONTROL lines, the switching circuitry responsive to a control signal on the CONTROL line and selectively changeable between a first state wherein the first device is connected to the interface circuitry and the DATA_TO_HOST line is disconnected from the interface circuitry, and a second state wherein the first device is disconnected from the interface circuitry and the DATA_TO_HOST line is connected to the interface circuitry to thereby connect the second device to the host computer.

15. Circuitry for controlling switching circuitry of a peripheral card coupled to an expansion slot of a host computer, the switching circuitry selectably connecting a data path between a host computer and either a first device mounted on the peripheral card, or a second device coupled to an auxiliary port of the peripheral card, the circuitry comprising:

circuitry for receiving serial data from the host computer via the auxiliary port of the peripheral card;

circuitry for comparing received serial data with a plurality of preselected command codes; and circuitry for sending a control signal to the switching circuitry via the auxiliary port of the peripheral card, so that the control signal is asserted when the received serial data matches a first preselected one of the command codes, and so that the control signal is released when the received serial data matches a second preselected one of the command codes.

16. The circuitry of claim 15 wherein the circuitry for receiving serial data, the circuitry for comparing the serial data to preselected command codes, and the circuitry for asserting the control signal is a microcontroller, a microprocessor, a microsequencer, or a programmable logic device.

17. The circuitry of claim 15 wherein in response to a preselected one of the command codes, data is serially transmitted from the second device to the host computer via the auxiliary port and switching circuitry of the peripheral card.

18. A method for a host computer to selectively communicate with a first peripheral device coupled to the host computer via an expansion slot, and a second peripheral device coupled to an auxiliary port of the first peripheral device, the first and second peripheral devices including circuitries for performing first and second peripheral tasks respectively, the method comprising the steps of:

transmitting data from the host computer to the second peripheral device at substantially the same time as the data is transmitted to the first peripheral device;

transmitting a preselected data sequence representing a command code from the host computer to the first and second peripheral devices;

generating a control signal by the second peripheral device responsive to the second peripheral device receiving a first preselected data sequence from the host;

changing states of switching circuitry within the first peripheral device responsive to the control signal, wherein the states of the switching circuitry include a first state wherein the circuitry performing the first peripheral task is coupled to the host computer and the circuitry performing a second peripheral task is disconnected from the host computer, and a second state wherein the circuitry performing the first peripheral task is disconnected from the host computer and the circuitry performing a second peripheral task is connected to the host computer.

19. The method of claim 18 further including the step of transmitting an acknowledgement from the circuitry for performing a second peripheral task to the host computer after the step of generating the control signal and the step of changing the state of the switching circuitry.

20. The method of claim 18 further including the step of releasing the control signal by the second peripheral device in response to the second peripheral device receiving a second preselected data sequence from the host computer.

21. The method of claim 18 wherein the step of providing data to the second peripheral device includes a step of converting the data to a serial bit stream.

22. The method of claim 18 wherein the step of sending a preselected data sequence comprises sending an ASCII "break" code followed by a preselected data value.

23. The method of claim 18 further including a step of biasing the control signal to a predetermined, default state in the event the second peripheral device is uncoupled from the auxiliary port of the first peripheral device.

* * * * *